US011953265B2

(12) United States Patent
Pasch et al.

(10) Patent No.: US 11,953,265 B2
(45) Date of Patent: Apr. 9, 2024

(54) METHOD FOR OPERATING AN ELECTRIC ARC FURNACE

(71) Applicant: SMS GROUP GMBH, Düsseldorf (DE)

(72) Inventors: Thomas Pasch, Erkrath (DE); Harmen Johannes Oterdoom, Düsseldorf (DE); Mesut Göcoglu, Duisburg (DE); Ralf Nörthemann, Sprockhövel (DE)

(73) Assignee: SMS GROUP GMBH, Düsseldorf (DE)

(*) Notice: Subject to any disclaimer, the term of this patent is extended or adjusted under 35 U.S.C. 154(b) by 636 days.

(21) Appl. No.: 17/279,866

(22) PCT Filed: Sep. 4, 2019

(86) PCT No.: PCT/EP2019/073501
§ 371 (c)(1),
(2) Date: Mar. 25, 2021

(87) PCT Pub. No.: WO2020/064280
PCT Pub. Date: Apr. 2, 2020

(65) Prior Publication Data
US 2022/0034586 A1 Feb. 3, 2022

(30) Foreign Application Priority Data

Sep. 27, 2018 (DE) ...................... 10 2018 216 539.4

(51) Int. Cl.
*F27B 3/28* (2006.01)
*C21C 5/52* (2006.01)
*F27B 3/08* (2006.01)
*F27D 19/00* (2006.01)
*H05B 1/02* (2006.01)

(52) U.S. Cl.
CPC ................ *F27B 3/28* (2013.01); *C21C 5/527* (2013.01); *F27B 3/085* (2013.01); *F27D 19/00* (2013.01); *H05B 1/023* (2013.01); *C21C 2005/5288* (2013.01); *C21C 2300/06* (2013.01); *F27D 2019/0003* (2013.01)

(58) Field of Classification Search
CPC ........ C21C 2005/5288; C21C 2300/06; C21C 5/527; F27B 3/085; F27B 3/28;
(Continued)

(56) References Cited

U.S. PATENT DOCUMENTS 4,071,687 A * 1/1978 Nakagawa .............. C21B 11/10
373/79
4,689,800 A 8/1987 Hanada
(Continued)

FOREIGN PATENT DOCUMENTS

DE 1533922 B1 8/1972
DE 2351171 A1 4/1974
(Continued)

*Primary Examiner* — Quang T Van
(74) *Attorney, Agent, or Firm* — LUCAS & MERCANTI, LLP; Klaus P. Stoffel

(57) ABSTRACT

A method for operating an electric arc furnace having at least one electrode, the method including the following steps: introducing material that is to be melted in the form of an actual mass flow into the electric arc furnace and feeding electrical energy via at least one electrode into the electric arc furnace in order to melt the introduced material depending on a previously determined, necessary electrical energy input. The necessary electrical energy input into the arc furnace is determined depending on the mass flow input into the furnace.

7 Claims, 5 Drawing Sheets

(58) Field of Classification Search
CPC . F27D 19/00; F27D 2019/0003; H05B 1/023; H05B 7/18; Y02P 10/20; Y02P 10/25; Y02A 40/10
USPC ............... 373/104, 102, 82, 81, 79, 88, 94; 75/477, 622, 380, 484, 770, 771, 772, 75/773, 479, 319, 709
See application file for complete search history.

(56) References Cited

U.S. PATENT DOCUMENTS

| | | | | |
|---|---|---|---|---|
| 8,075,665 | B2* | 12/2011 | Ehara | ............... C21B 13/006 |
| | | | | 75/622 |
| 8,101,007 | B2* | 1/2012 | Sugitatsu | ............ C22B 19/34 |
| | | | | 75/484 |
| 2008/0063024 | A1 | 3/2008 | Pasch | |

FOREIGN PATENT DOCUMENTS

| | | |
|---|---|---|
| DE | 3543773 A1 | 6/1986 |
| DE | 102004046728 A1 | 4/2006 |
| EP | 1872074 B1 | 1/2008 |
| EP | 1360876 B1 | 10/2011 |
| EP | 2564141 B1 | 4/2016 |
| EP | 1985952 B2 | 11/2016 |
| EP | 3124903 A1 | 2/2017 |
| EP | 2910085 B1 | 12/2017 |
| GB | 1116268 A | 6/1968 |
| GB | 1447690 A | 8/1976 |
| WO | 2007048502 A1 | 5/2007 |

* cited by examiner

— METHOD FOR OPERATING AN ELECTRIC ARC FURNACE —

CROSS-REFERENCE TO RELATED APPLICATIONS

The present application is a 371 of International application PCT/EP2019/073501, filed Sep. 4, 2019, which claims priority of DE 10 2018 216 539.4, filed Sep. 27, 2018, the priority of these applications is hereby claimed and these applications are incorporated herein by reference.

BACKGROUND OF THE INVENTION

Field of the Invention

The invention relates to a method for operating an electric arc furnace, in particular an electric reduction furnace. Electric arc furnaces, in particular electric reduction furnaces, are used to melt and to reduce feedstock materials, such as e.g. FeCr, TiO2, FeNi, DRI, etc., in open or closed furnace vessels with in some instances freely combustible arcs (open-bath processes).

Prior Art

FIG. 5 illustrates a method for operating an electric arc furnace 100 that is known from the prior art.

After the disconnecting switch (208) and the circuit breaker (207) have been closed, the electrical energy ($W_{electr.}$) from an energy supply rail (201) is fed to the arc furnace (100) via at least one electrode (104). At least one furnace transformer (202) serves to step down the system voltage on the primary side to a secondary voltage required for furnace operation. In this case, a tap switch (203) can set the secondary voltage in a stepped manner. Preferably, at least one power electronic power converter (204) connected between the energy supply rail and the electrode is provided, which can set the voltage (205) continuously variably in an advantageous embodiment.

In this case, it is unimportant whether the power converter (204) is situated in the form of an AC power controller or rectifier on the secondary side of the furnace transformer or in the form of an AC power controller or a variable inductor coil on the primary side of the furnace transformer (202). The arrangement and number of the electrodes (104) are unimportant as well. Usually, but not necessarily, however, one or two electrodes is or are used as cathode in DC furnaces, or 3 or 6 electrodes in three-phase furnaces. By means of an electrode position adjustment (105), the electrodes can be adjusted vertically in height, which makes it possible to influence the arc length and thus the arc resistance. According to Ohm's law, an electric current flows when a voltage is applied, said current being limited by the bath resistance and the reactance of the furnace system. Voltage and current can be measured by means of voltage measurement (205) and current measurement (206) for each electrode. The power introduced into the furnace vessel (101) per electrode (104) results from the relationship $$P = R * I^2 \quad (1)$$

By means of a material conveying device (302), material from at least one upstream furnace bunker (301) is fed to a furnace vessel (101). The amount and thus the mass flow $q_m$ can be measured or determined by means of a weight detector (303).

The material is melted by the electrical energy supplied, which is converted into thermal energy within the furnace vessel. Liquid metal (103) and liquid slag (102) accumulate within the furnace vessel (101). At cyclic intervals, hot metal and hot slag can be discharged from the furnace vessel through metal and slag tapping holes (106; 107) provided therefor.

Even small inaccuracies in the energy and mass balance (404) within the furnace vessel (101) lead to instabilities in the production process and the temperature of slag (102) and metal (103) deviates from the ideal setpoint temperature.

If the energy introduced is too low in relation to the amount of material introduced, the material introduced is not melted optimally; the metal (103) and the slag (102) situated in the furnace vessel (101) cool down. In this case, the furnace resistance (electrical bath resistance+arc resistance) also becomes more unstable. Accordingly, the electrical power input and the electrical energy input (W electr.) fluctuate. The energy $W_g$ stored in the furnace vessel (101) decreases.

It is even worse if the energy introduced is too high in relation to the amount of material introduced. The energy $W_g$ stored in the furnace vessel (101) and also the temperature of the slag and metal rise relatively rapidly, the energy efficiency falls and damage to the furnace vessel (101) can occur. As a countermeasure, the introduction of power has to be reduced or even interrupted. In contrast to the temperature of the slag and metal rising relatively rapidly, it can take days until a setpoint temperature has become established again. The production volume decreases as a consequence.

FIG. 6 shows an exemplary temporal profile of a known power measurement, of a known voltage measurement (206) and of a current measurement (205) of a DC arc furnace. At the point in time $t_1$ there is a change in the material feed that leads directly to an instability in the introduction of power (point in time $t_1$ to $t_2$). It is in extremely rare cases that these irregularities are actually able to be recognized by the operator; in general, they are noticed only after an extensive analysis by an experienced metallurgist.

In this context, modern apparatuses are becoming ever larger and more powerful in order to increase the profitability during operation of these installations. As apparatuses become larger, it becomes more and more important to know the energy and material balance and to be able to control as accurately as possible in particular the ratio of amount of material introduced to energy introduced, and to be able to react to deviations of material parameters or process values. Correction measures are difficult to implement and require better possibilities for supervision regarding the metallurgical furnace process and simplifications in operator control and observation.

At the present time, electric arc furnaces are manufactured and operated in a variety of embodiments and with a variety of controllers for the power closed-loop control or the material input.

In the case of most known arc furnaces operated with AC current or operated with DC current, the electrical energy from an AC current supply line is introduced into the furnace by means of height-adjustable electrodes. In this case, the electrical energy is converted into thermal energy in the form of arcs and resistance heating (Joule effect), said thermal energy heating the material introduced.

The European Patent Application EP 2 910 085 describes a device and a method for the process-controlled power regulation of an arc furnace. The device comprises a plurality of types of sensor (thermal, structure-borne sound, radiation) for detecting present operating parameters as a function of time, a control and regulating unit and at least one furnace transformer with at least one on-load tap changer, which on the primary side switches the winding taps of the primary side of the furnace transformer.

The international application WO 2007/048502 A1 relates to a control device for AC reduction furnaces having electrodes, which comprises a transformer and a control system for the controlled energy input into the AC reduction furnaces, wherein the control device furthermore comprises controllable power electronic AC switches connected into the high-current conductors on the secondary side. The control device is embodied in such a way that brief fluctuations of the electrical parameters are compensated for only by the AC switches.

The European Patent EP 1 360 876 B1 describes a power control system for an electric arc furnace operated with AC current, comprising a variable reactance and a variable reactor controller for triggering a change in the variable reactance, characterized in that the variable reactor controller is suitable for monitoring an impedance of the electrode and for triggering a change in the variable reactance depending on changes in the monitored impedance of the electrode, in order to reduce fluctuations in the introduction of active power into the electrode.

The European Patent Application EP 1985 952 B2 describes a method for controlling the metal feed into an arc furnace, which involves determining a cover index of the electric arc by slag. The speed of the metal feed is increased, maintained or reduced.

The prior art discloses for example the following electrical components for a control of the power input into an arc furnace optionally or in a complementary combination:
  furnace transformers with integrated tap switches, enabling the energy input to be set in a stepped manner;
  secondary-side power electronic AC switches or controllable rectifiers enabling a sufficient continuously variable line closed-loop control;
  variable inductor coils which can vary the reactance by means of thyristor switches connected in parallel and thus stabilize the power input into the furnace.

By means of a height position adjustment of the electrodes, it is furthermore possible to influence electrical and metallurgical parameters, such as arc length, arc impedance and/or the radiant energy.

Furthermore, the prior art discloses mechanical devices for introducing the material input and controllers for the material input.

Materials can be introduced for example batchwise by means of scrap baskets or by means of charging devices, or continuously by means of conveying devices. In this case, as is known, the material input is controlled manually by the operator, depending on the filling level in the furnace or depending on a "cover index" of the electric arc with slag or just merely as a function of time, by a setpoint value being predefined by the operator.

Even if known systems include both continuous material conveying devices and power electronic devices for inputting electrical energy into the furnace, such as AC switches or controllable rectifiers (on the primary side or secondary side of the furnace transformer), in the case of the known devices and methods there is the problem of not being able to react sufficiently to disturbances in the conveying system or to deviations from the respective setpoint value or to relatively large inaccuracies in material charging. Even relatively small deviations in the electrical power input change the energy balance for a long time. As a consequence of that, the metallurgical process can lose equilibrium and the temperature of the metal and slag can deviate from a respective setpoint temperature. In the worst case, it is even possible for critical temperatures to occur which can lead to wear or damage to the furnace vessel. The metallurgical production process comes to a halt, and the production volume and energy efficiency decrease.

Finally, the European Patent Specification EP 1 872 074 B1 discloses a method for the measurement and control of metal and scrap feeding into an electric arc furnace. In this case, the material inflow into the electric arc furnace is optimized by the speed at which the material is fed being effected in accordance with the electrical energy supplied at the furnace.

The technical teachings specified in EP 1 872 074 B1 has the disadvantage, however, that the weight of the input material is relatively low in relation to the measured weight of the entire furnace shell, its contents and any other components, which can amount to several hundred tonnes. This has the consequence that a weighing device used for all these masses can have relatively large measurement errors. Furthermore, it is disadvantageous that the input of the electrical energy is not adapted in the case of disturbances or in the case of relatively large inaccuracies in the feeding of material; on the contrary, the full electrical energy input into the furnace is expressly maintained.

The specific energy demand or a required energy input is not adapted. As a consequence, irregularities in the energy balancing are noticed too late. The temperature of the metal and slag therefore easily loses its setpoint temperature and can assume to that extent critical temperatures which can lead to wear at the furnace vessel. The metallurgical production process comes to a halt, and the production volume and energy efficiency decrease.

Proceeding from this prior art, the invention is based on the object of developing a known method for operating an electric arc furnace, in particular an electric reduction furnace, to the effect that the production volume and the energy efficiency during operation of the electric arc furnace increase.

SUMMARY OF THE INVENTION

This object is achieved by means of a method in which Claim 1. the required electrical energy input into the electric reduction furnace is determined depending on the mass flow input into the furnace.

The advantage of the invention firstly consists in having recognized that the control of an optimum material/energy balance by varying the required electrical energy input into the electric arc furnace depending on the input mass flow has a positive effect on the metallurgical process, as a result of which production and energy efficiency can be increased. Secondly, the claimed procedure is based on the insight that if necessary the energy input or the power setpoint value for the electric arc furnace can advantageously be changed significantly more accurately and more reliably than the material input into the furnace.

The dependent claims relate to the further advantageous configurations of the present invention.

DETAILED DESCRIPTION OF THE INVENTION

The invention is explained in detail below in the form of exemplary embodiments with reference to FIGS. 1 to 4 mentioned.

Figure 1:
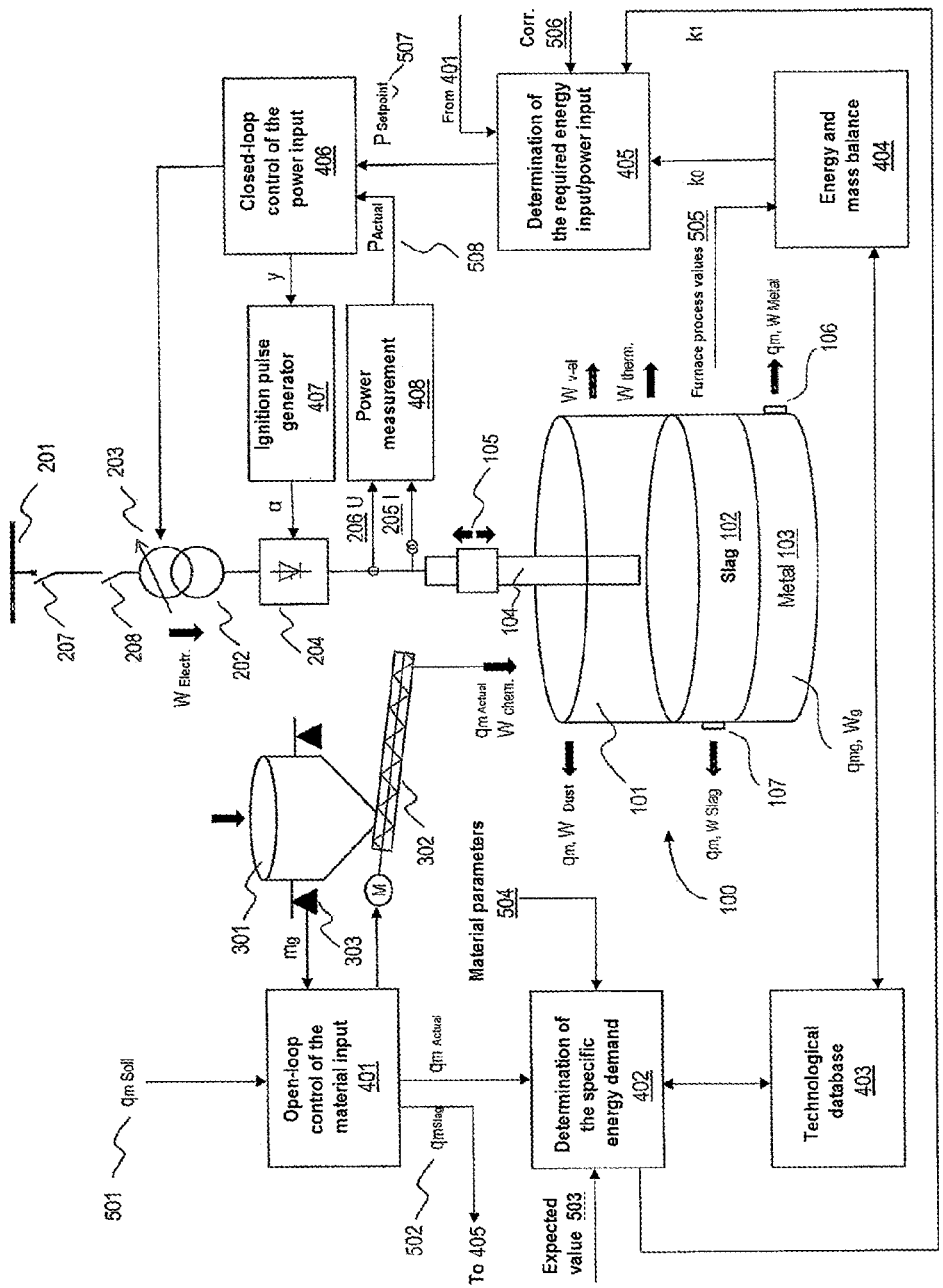
FIG. 1 illustrates the method according to the invention for operating an electric arc furnace.

FIG. 1 shows the function blocks for the open-loop control and closed-loop control of the material input and energy input according to the invention into an electric arc furnace.

By means of an input possibility of the open-loop control of the material input 401, the operator can predefine a setpoint value 501; $q_{m\ setpoint}$ for the material input or the mass flow. According to the desired material input, at least one material conveying device is actuated and the amount of material actually introduced is measured by means of at least one weight detector 303. The function block 401 calculates the actual material input 502; $q_{m\ actual}$ as a function of time.

In an advantageous closed-loop control, the desired material input (setpoint value) is compared with the actual material input (actual value) and the difference is fed to a controller, which adapts a manipulated variable for the material conveying device 302 such that the control difference becomes as small as possible.

The function block 402 determines the specific energy demand for the furnace 100 on the basis of measured or input material parameters 504. Said material parameters can be e.g. the composition and analysis of the feedstock materials, information concerning the prereduction, temperature, moisture content, or other values that are expedient for determining the specific energy demand. Furthermore, an expected value 503 can be predefined and taken into account in the determination of the specific energy demand. The specific energy demand can be compared with historical data from a technological database (403) and can optionally be concurrently adapted by a process model. As a result, the function block 402 transfers a coefficient $k_1$ representing the specific energy demand to the downstream open-loop control steps. In this case, the coefficient $k_1$ is preferably cyclically recalculated.

If e.g. material that has already been prereduced is introduced into the reduction furnace, the coefficient $k_1$ decreases according to the material properties. In this case, the specific energy demand falls and the energy efficiency rises.

In the function block energy and mass balance 404, essentially the thermal energy stored in the furnace vessel 101 is determined from temperature and mass of the slag 102 contained and the metal 103 contained, and the electrical $W_{v\text{-}el}$ and thermal $W_{therm}$ losses are calculated. For this purpose, the function block 404 receives all required and expedient furnace process values 505 expedient assumptions and historical data from the technological data base 403.

Figure 2:
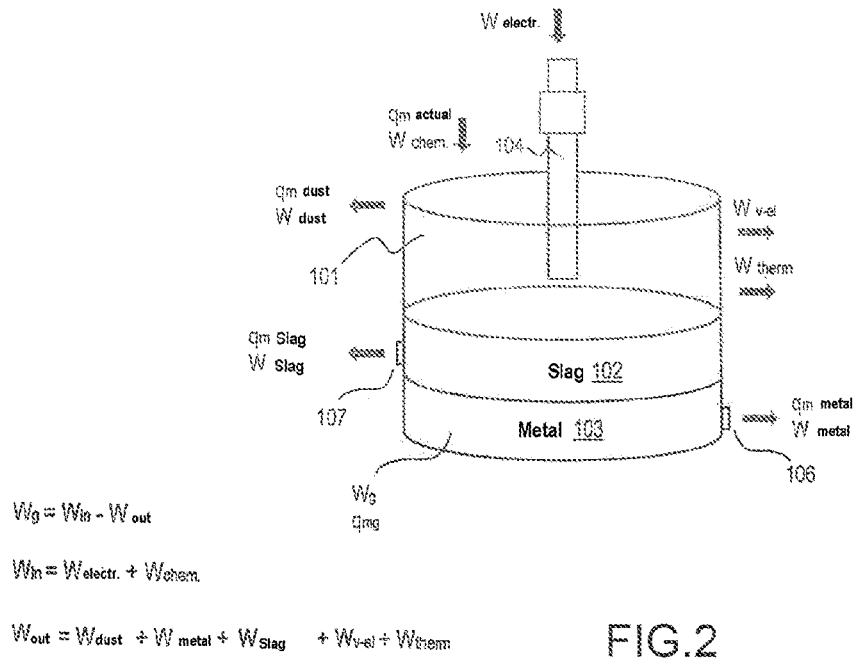
FIG. 2 illustrates the energy balance in an electric arc furnace.

FIG. 2 illustrates the manner of operation of the function block energy and mass balance 404 in greater detail.

The energy fed to the furnace vessel 101 results from the sum of the electrical energy $W_{electr.}$ and the chemical energy $W_{chem}$ fed in with the feedstock materials.

$$W_{in}=W_{electr.}+W_{chem} \qquad (2)$$

The energy dissipated from the furnace vessel results firstly from the thermal energy $W_{exhaust}$ gas dissipated by the hot exhaust gas, the electrical $W_{v\text{-}el}$ and thermal $W_{therm}$ losses, and also from the energy dissipated by the hot slag $W_{slag}$ and the hot metal $W_{metal}$:

$$W_{out}=W_{exhaust\ gas}+W_{metal}+W_{slag}+W_{v\text{-}el}+W_{therm} \qquad (3)$$

In this case, the thermal energy losses are substantially represented by thermal losses to cooling water and cooling air, and other thermal losses to the surroundings.

The difference between the energy fed in and the energy dissipated is a measure of the thermal energy $W_g$ stored in the furnace vessel 101.

$$W_g=W_{in}-W_{out} \qquad (4)$$

In this case, the stored thermal energy $W_g$ is substantially subdivided into the energy of the liquid metal and of the slag.

The mass of slag 102 and metal 103 contained in the furnace vessel 101 increases as a result of the material input $q_{m\ actual}$ fed to the furnace vessel and decreases as a result of the tapped metal $q_{m\ metal}$ and the tapped slag $q_{m\ slag}$. Furthermore, the mass decreases to a small extent owing to dust losses $q_{m\ dust}$.

$$q_{m\ in}=p_{m\ actual} \qquad (5)$$

$$q_{m\ out}=q_{m\ metal}+q_{m\ slag}+q_{m\ dust} \qquad (6)$$

$$q_{mg}=q_{m\ in}-q_{m\ out} \qquad (7)$$

Referring to FIG. 1 again:

The results of a discontinuous or continuous measurement of the temperature of the metal and/or slag, the bath level and/or the furnace temperature, and other expedient process measurements can additionally be used to correct the concurrent calculation of the energy and mass balance 404. The task of the function block 404 is firstly to provide the operator with these data for observing the process and secondly to keep in balance the energy $W_g$ stored in the furnace in relation to the mass of the slag $q_{m\ slag}$ and of the metal $q_{m\ metal}$. For this purpose, the function block (404) calculates a coefficient $k_0$ for the function block 405. In this case, the coefficient $k_0$ is cyclically recalculated.

A good online visualization of the material/energy balance on a supervisory monitor improves the process supervision, increases the understanding of the metallurgical process and simplifies the operator control. This can be effected e.g. in the form of Sankey diagrams or similar diagrams or tables.

If the heat losses decrease for various reasons, the coefficient $k_0$ decreases accordingly. The energy consumption falls and the energy efficiency rises.

Figure 3:
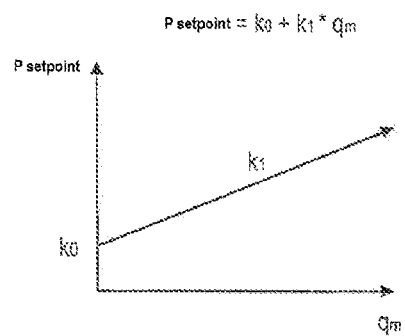
FIG. 3 illustrates a functional relationship between the energy or power to be fed to the furnace and the mass flow input into the furnace.

The function block 405 determines a power setpoint value $P_{setpoint}$; 507 from the material input $q_{m\ actual}$ fed in, the coefficient $k_0$ and the coefficient $k_1$ in accordance with a curve/table or mathematical function stored in the function block. FIG. 3 shows by way of example such a possible curve or a first-order mathematical function.

$$P=k_0+k_1*q_m \qquad (8)$$

Deviations of this function are conceivable depending on the embodiment and metallurgical process.

In one advantageous embodiment, the coefficients $k_0$ and $k_1$ are continuously or cyclically captured and optimized by the open-loop control/process model, depending on interactions that occur.

Via an operator interface, the operator has the possibility of manually intervening in the automatic calculation of the values and correcting the latter if necessary. Moreover, it is conceivable, for different operating points of the process, to store different coefficients in an electronic table or within the database.

The function block of the power measurement (408) determines the actual power per electrode or per pair of electrodes from the current measurement (205) and the voltage measurement (206), by means of the mathematical relationship $$P = U*I*\cos\Phi \qquad (9)$$

In this case, the power factor $\cos\Phi$ corresponds to the phase shift between current and voltage. Depending on the process and arrangement of the measuring instruments (205; 206), the assumption $\cos\Phi=1$ can be made for simplification. As a result, the relationship is simplified to $$P = U*I \qquad (10)$$

The function block 406 serves for the closed-loop control of the power input. Within the function block, firstly the control deviation is calculated from the difference between setpoint power ($P_{setpoint}$) and actual power of the respective electrodes. Depending on the control deviation, a controller determines the manipulated variable (y) for the downstream ignition pulse generator (407), in accordance with a controller characteristic curve stored in the controller or an electronic calculation method. Said generator then adjusts the ignition angle ($\alpha$) for the driving of at least one power converter. As a result, the output voltage of the power converter (204) is adjusted until the actual power corresponds to the setpoint power. In the event of limit values being undershot or overshot, the tap switch (203) of the furnace transformer (202) can additionally be increased or reduced, respectively. Moreover, it is conceivable, in a less advantageous but less expensive alternative embodiment, to dispense with the power converter (204) and to use only the tap switch (203) for power closed-loop control. For automatic correction of a remaining control difference, the actual value of the power $P_{actual}$ (as part of the furnace process values 505) can be fed back to the function block of the energy and mass balance (404) and—if necessary—the coefficient $k_0$ can be adapted in the next cycle.

Figure 4:
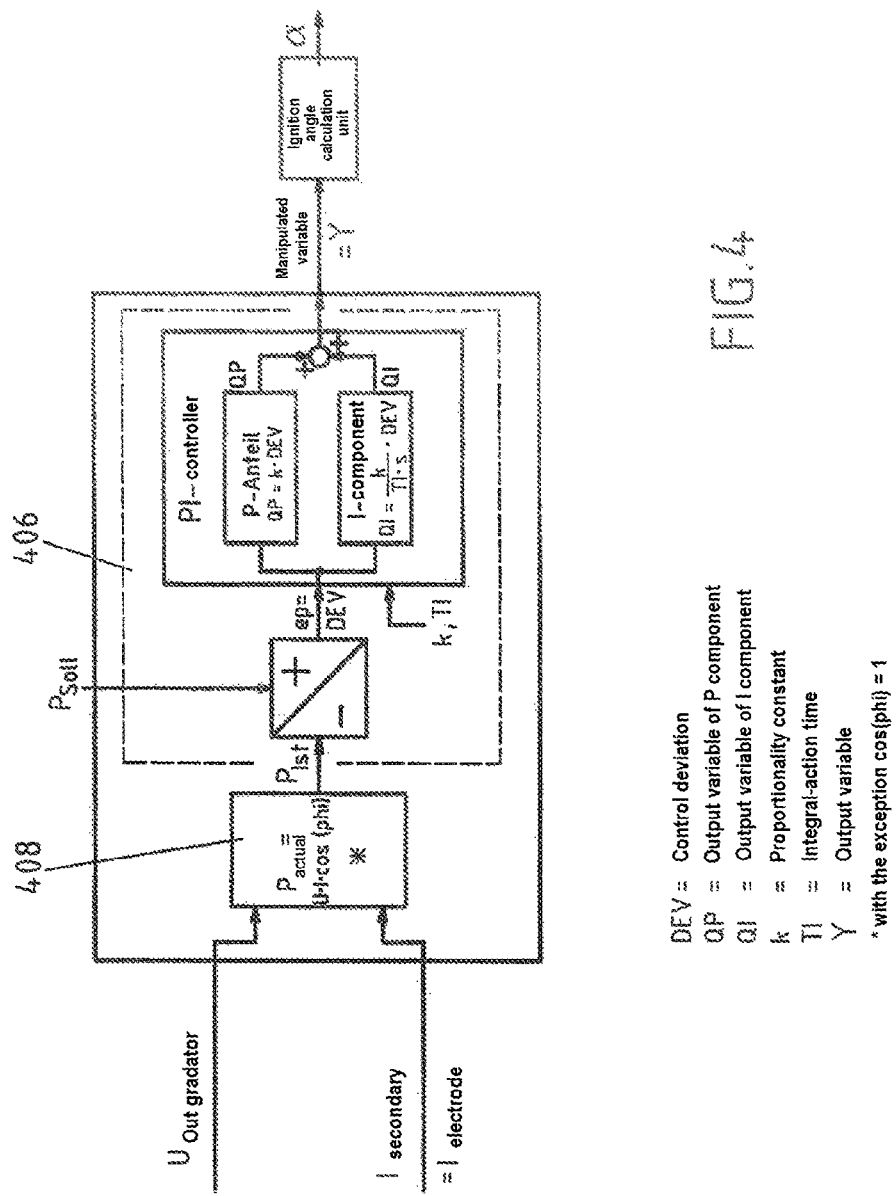
FIG. 4 illustrates the closed-loop control of the electrical power according to the present invention.
Figure 5:
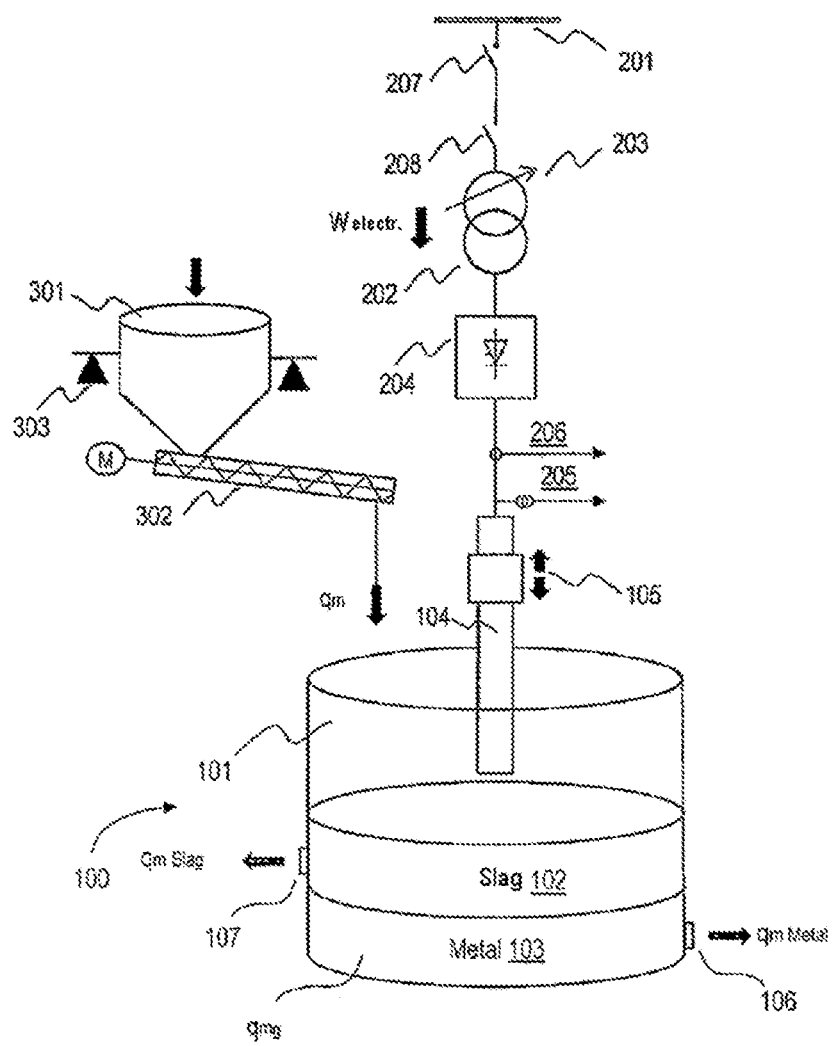
FIG. 5 illustrates a method for operating an electric arc furnace from the prior art.
Figure 6:
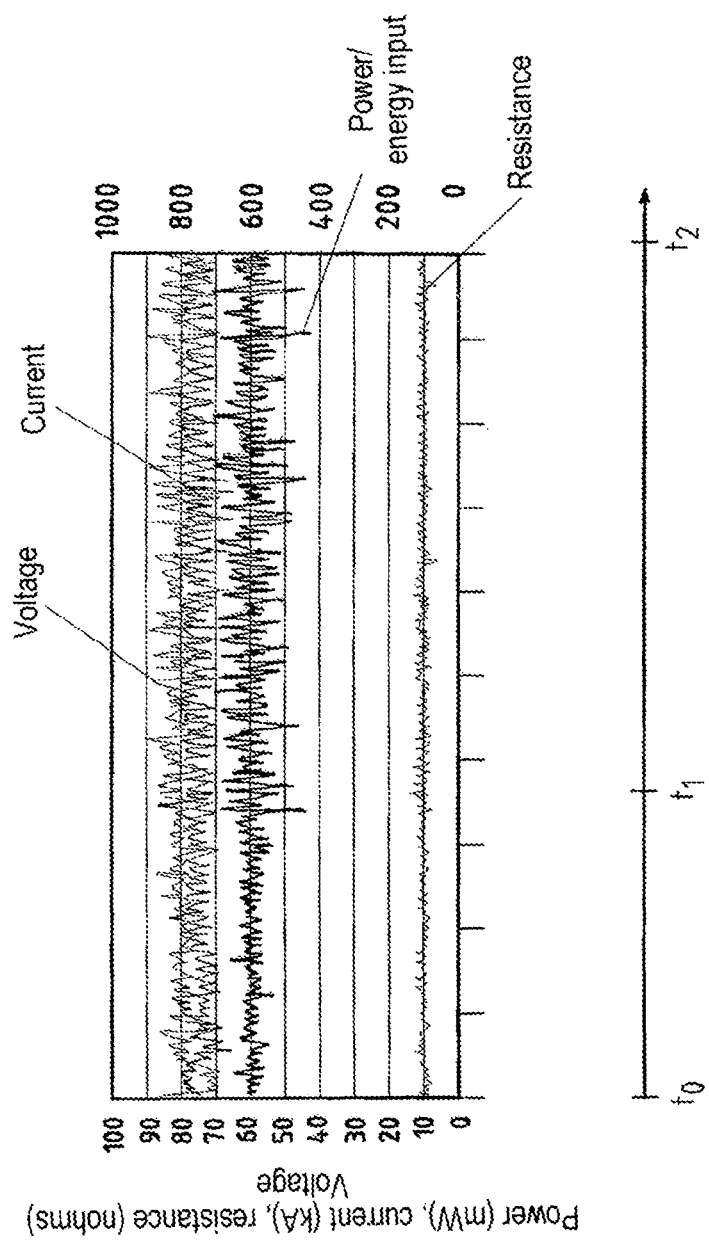
FIG. 6 illustrates the effects of a material input into the electric arc furnace on the profile of the electrical energy in the prior art.

FIG. 4 shows a possible advantageous embodiment of a power control loop by means of a proportional-integral controller (PI controller).

Besides the driving of the power converter (204) by means of an ignition angle calculation and the phase gating of power semiconductors, a pulse width modulation, a chopper control, or pulse control or a comparable technology for controlling the energy input into the electric arc furnace is also possible.

LIST OF REFERENCE SIGNS

100 Arc furnace
101 Furnace vessel
102 Slag
103 Metal
104 Electrode
105 Electrode position adjustment
106 Metal tapping
107 Slag tapping
201 Energy supply rail
202 Furnace transformer
203 Tap switch
204 Power converter
205 Current measurement
206 Voltage measurement
207 Circuit breaker
208 Disconnecting switch
301 Furnace bunker
302 Material conveying device
303 Weight detector
401 Open-loop control of the material input
402 Determination of the specific energy demand
403 Technological database
404 Energy and mass balance
405 Determination of the required energy input
406 Power closed-loop control
407 Ignition pulse generator
408 Power measurement
501 Material input (setpoint value)
502 Material input (actual value)
503 Expected value of the specific energy consumption
504 Material parameters
505 Furnace process values
506 Correction values
507 Furnace power (setpoint value)
508 Furnace power (actual value)
$W_{electr.}$ Electrical energy
$W_{chem}$ Chemical energy
$W_{in}$ Energy fed in
$W_g$ Stored energy
$W_{out}$ Dissipated energy
$W_{dust}$ Energy of the dissipated exhaust gas
$W_{v-el}$ Electrical losses
$W_{therm}$ Thermal losses
$W_{slag}$ Energy of the discharged slag
$W_{metal}$ Energy of the discharged metal
$q_{m\ setpoint}$ Desired material input (setpoint value)
$q_{m\ actual}$ Actual material input (actual)
$q_{m\ metal}$ Tapped metal
$q_{m\ slag}$ Tapped slag
$q_{m\ dust}$ Dust losses
$q_{mg}$ Stored material
$q_{m\ in}$ Material fed in
$q_{m\ out}$ Material fed out
$k_0$ Coefficient 0
$k_1$ Coefficient 1
$P_{setpoint}$ Power (setpoint value)
$P_{actual}$ Power (actual value)
$\cos\Phi$ Power factor
$\alpha$ Ignition angle
Y Manipulated variable

The invention claimed is:

1. A method for operating an electric arc furnace having at least one electrode, the method comprising the steps of:
introducing material as an actual mass flow into the electric arc furnace, wherein the electric arc furnace is an electric reduction furnace for melting and reducing the material introduced;
feeding electrical energy via the at least one electrode into the electric reduction furnace to melt the introduced material according to a required electrical energy input determined previously; and
determining the required electrical energy input into the electric reduction furnace depending on the mass flow $q_{mactual}$ input into the furnace, wherein the required energy input is determined as a power setpoint value $P_{setpoint}$ and is introduced into the electric reduction furnace by either a power open-loop control or a power closed-loop control, wherein the step of determining the required energy input comprises the following sub steps:

predefining or determining a specific energy demand as an energy demand parameter $k_1$, wherein the determining is effected depending on a predefined expected energy value for operation of the electric reduction furnace, the mass flow $q_{mactual}$ input into the electric reduction furnace, and/or depending on properties of the input material;

predefining or determining thermal energy stored in a vessel of the electric reduction furnace in relation to a mass of slag and to a mass of the material tapped from the electric reduction furnace as a loss parameter $k_0$; and determining the required electrical energy input as a power setpoint value $P_{setpoint}$ for the electric reduction furnace depending on the mass flow $q_{mactual}$ input into the electric reduction furnace, the energy demand parameter $k_1$ and the loss parameter $k_0$.

2. The method as claimed in claim 1, wherein the properties of the material introduced into the electric arc furnace which are taken into account when determining the specific energy demand are at least one of the group consisting of: chemical composition, temperature and/or moisture content of the input material, and whether the input material had previously already been subjected to a prereduction.

3. The method as claimed in claim 1, wherein the determination of the required electrical energy input $P_{setpoint}$ is effected using a predefined functional relationship between the power setpoint value and the parameters $q_{mactual}$, $k_0$ and $k_1$, and optionally also a correction factor $k_2$.

4. The method as claimed in claim 3, wherein the functional relationship is represented as follows:

$$P_{setpoint} = (k_0 + k_1 * q_{mactual}) * k_2.$$

5. The method as claimed claim 1, wherein the determination of the required electrical energy input $P_{setpoint}$ and of at least individual parameters from among those required for calculating said energy input is effected continuously during the operation of the electric reduction furnace.

6. The method as claimed in claim 5, wherein the individual parameters are the mass flow $q_{mactual}$, the specific energy demand $k_1$ and/or the loss parameter $k_0$.

7. The method as claimed in claim 1, wherein actual power input into the electric reduction furnace is set to a power setpoint value in the power open-loop control or is controlled to the power setpoint value in the power closed-loop control, in each case by varying an ignition angle of a power converter as actuator or by varying a setting of a tap switch of a transformer of the electric reduction furnace as actuator.

\* \* \* \* \*